Kiryako Arvanetakis
INVENTOR.

BY Hayden + Pravel

ATTORNEYS

Kiryako Arvanetakis
INVENTOR.

BY Hayden + Pravel

ATTORNEYS

April 13, 1965 K. ARVANETAKIS 3,178,576

RADIOGRAPHIC SCANNING OF A PIPE USING PLURAL SEQUENTIALLY ENERGIZED DETECTORS FOR SCANNING

Filed June 18, 1962 7 Sheets-Sheet 3

Kiryako Arvanetakis
INVENTOR.

BY Hayden + Pravel

ATTORNEYS

Kiryako Arvanetakis
INVENTOR.

BY Hayden & Pravel

ATTORNEYS

Kiryako Arvanetakis
INVENTOR.
BY Hayden + Pravel
ATTORNEYS

Kiryako Arvanetakis
INVENTOR.

BY Hayden + Pravel

ATTORNEYS

Kiryako Arvanetakis
INVENTOR

BY Hayden + Pravel

ATTORNEYS

United States Patent Office 3,178,576
Patented Apr. 13, 1965

3,178,576
RADIOGRAPHIC SCANNING OF A PIPE USING PLURAL SEQUENTIALLY ENERGIZED DETECTORS FOR SCANNING

Kiryako Arvanetakis, 5254 W. Bellfort, Houston, Tex.
Filed June 18, 1962, Ser. No. 203,123
4 Claims. (Cl. 250—83.3)

This invention relates to new and useful improvements in apparatus and methods for radiographic inspection, and particularly apparatus and methods for radiographic scanning of pipe.

In the drilling of wells, it is often desirable, or even necessary, to inspect the drill pipe and other well pipe as such pipe is being pulled from the well hole to determine the condition of the pipe. For example, it is desirable to locate any leaks, thin spots, corrosion pitting, stress cracks and make wall thickness measurements. Various apparatus and methods have been proposed and tried heretofore, but so far as is known, all of the prior apparatus and methods have been unsatisfactory. In the pulling of drill pipe from a well, the rate of pulling has not only been too rapid for some of the prior apparatus and methods, but also, the irregular rates at which the pipe is pulled has been a problem. The same general problems are present when attempting to inspect pipe as it is lowered into a well.

It is one object of the present invention to provide a new and improved apparatus and method for radiographic inspection of pipe which is not adversely affected by a rapid rate of movement of the pipe or by changes in such rate of movement.

An important object of this invention is to provide a new and improved method and apparatus which is adapted to automatically inspect the entire circumference of pipe at such a high rate that relative movement between such pipe and apparatus may far exceed any rates of such relative movement normally used, or even theoretically possible today, in the raising or lowering of the pipe in wells, thereby making it possible to inspect the pipe at the maximum rate.

Another object of this invention is to provide a new and improved method and apparatus of radiographically inspecting the entire circumference of pipe with or without relative movement between the pipe and the apparatus, such inspection being accomplished by means of electrical or electronic switching or scanning.

A further object of this invention is to provide a new and improved radiation apparatus for radiographically inspecting drill pipe and other objects as they are moved upwardly or downwardly in a well.

A particular object of this invention is to provide a new and improved method and apparatus for radiographic inspection of various kinds of pipe, solid bars such as sucker rods, and other objects, whether made of iron, steel, aluminum, or any other material adapted to be penetrated by radiographic rays such as X-rays, gamma rays, and the like.

A specific object of this invention is to provide a new and improved apparatus for inspecting drill pipe and other pipe including their tool joints, upset portions, or other external surface irregularities.

A significant object of this invention is to provide a new and improved apparatus for successively switching to different circularly disposed radiation detectors disposed about a pipe or other object to be inspected so as to obtain a circumferential radiographic inspection without requiring rotational or circumferential movement of said detectors relative to said pipe or other object.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Figure 1:
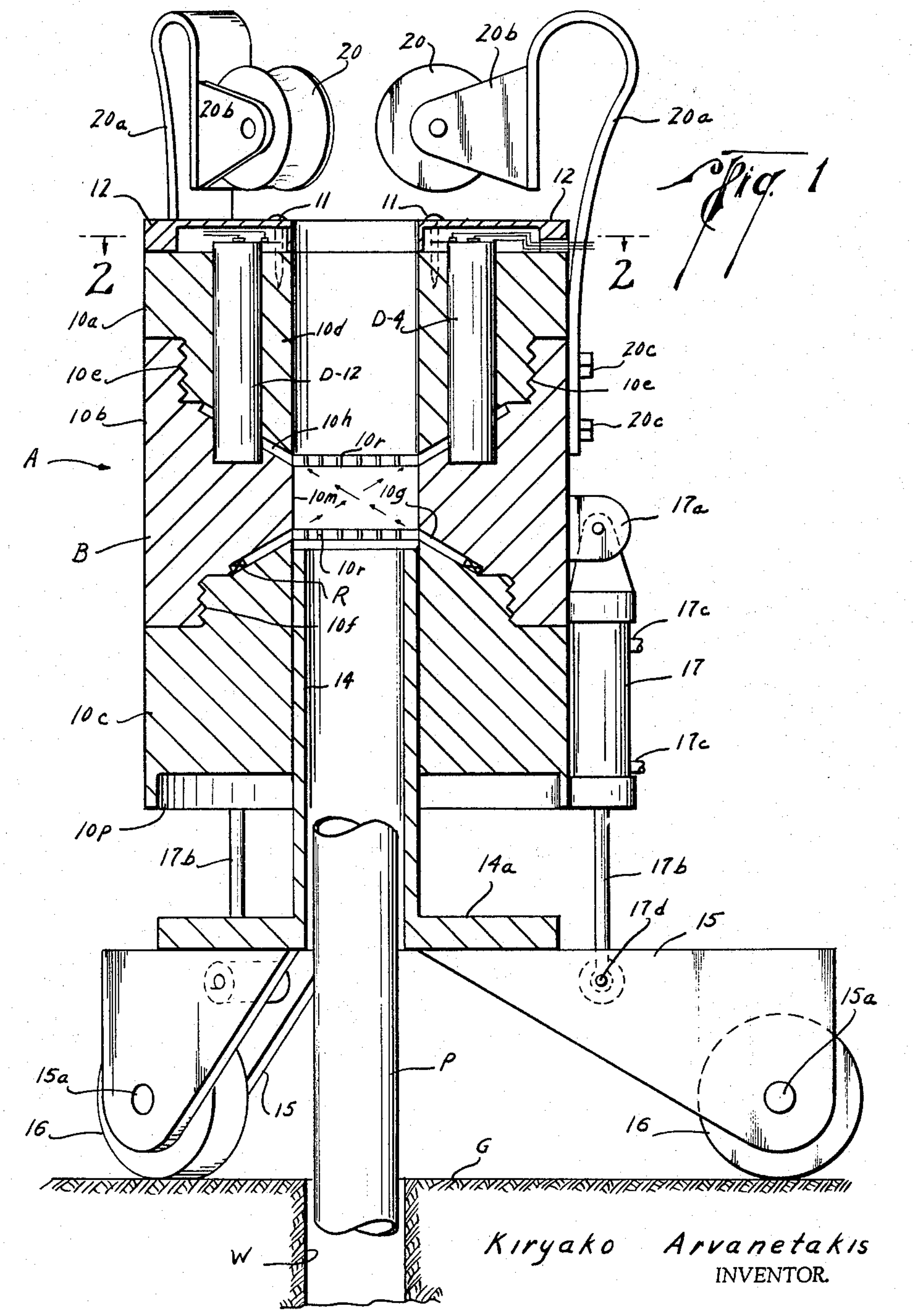
FIG. 1 is a view partly in elevation and partly in section illustrating one form of the apparatus of this invention.
Figures 2, 14:
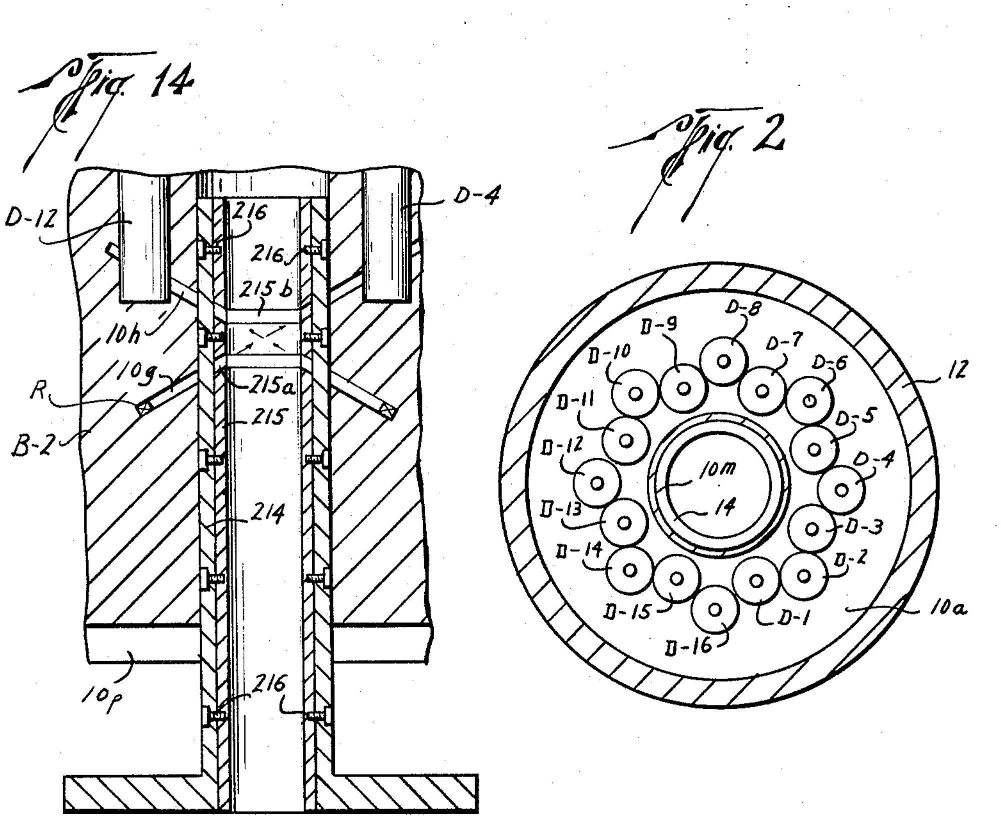
FIG. 2 is a cross-sectional view taken on line 2—2 of FIG. 1 and further illustrates the apparatus of FIG. 1.
Figures 12, 13, 15:
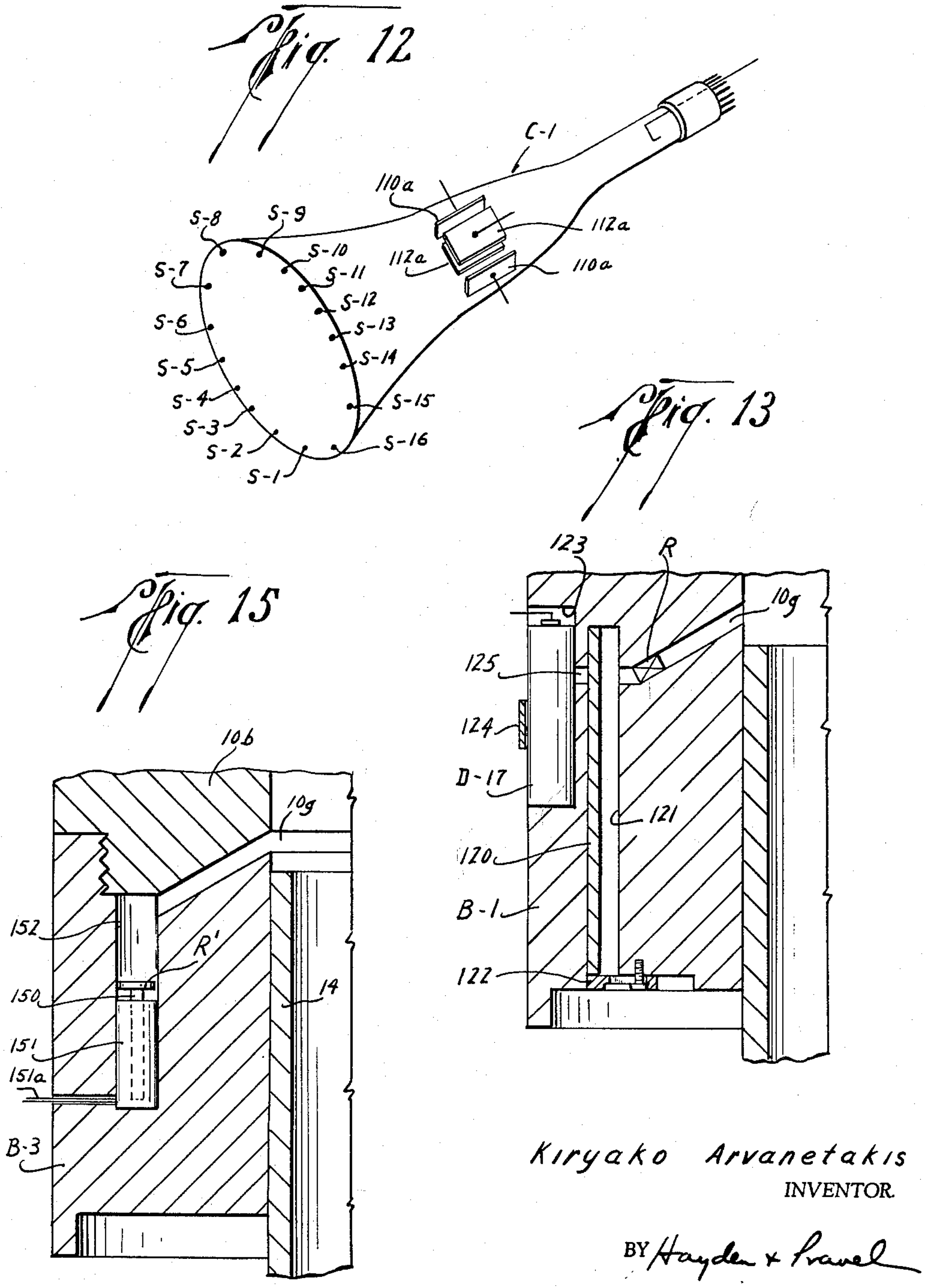
FIG. 12 illustrates a modified vacuum tube cyclophone type as compared to the cyclophone tube used in the circuit of FIG. 11.
FIG. 13 is a partial sectional view of a modified form of the apparatus illustrated in FIG. 1, wherein a standard sample of the material of the object being inspected is also detected radiographically for comparison purposes.

FIG. 14 is a vertical sectional view of a portion of a modified form of the apparatus of FIG. 1, wherein a modified closure sleeve is provided for adjustably changing the inner bore or diameter of the body of the apparatus of FIG. 1; and FIG. 15 is a vertical sectional view illustrating a portion of the apparatus of FIG. 1 in a modified form, wherein an annular radiographic source is retractable in the body of the apparatus.

In the drawings, the letter A designates generally the apparatus of this invention which includes a body B which is adapted to receive and hold a source R of radiographic rays externally of a pipe P or other object to be inspected. The body B also includes a plurality of radiation detectors D–1 through D–16, the number of which may vary, for detecting radiation which passes through the pipe P or other object to be inspected from the source R to the detectors D–1 through D–16. As will be explained in detail, the detectors D–1 through D–16 are in an electrical circuit with suitable indicator means such as an oscilloscope S (FIG. 3) and/or a recorder strip or tape T (FIG. 3).

Figure 3:
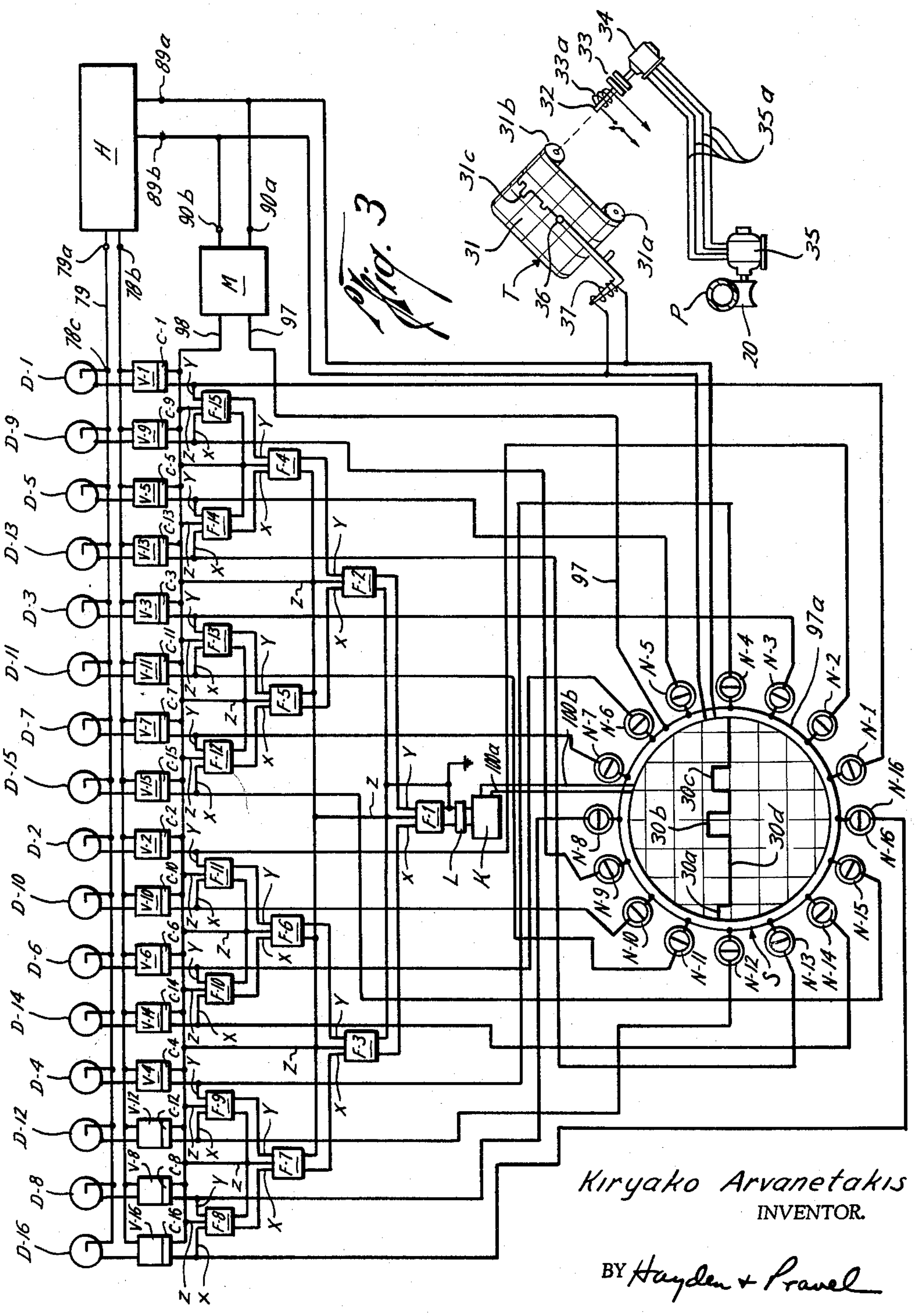
FIG. 3 is a schematic view of the electrical circuit of the apparatus used in conjunction with the apparatus of FIG. 1.

Considering the invention more in detail, and particularly the form of the invention shown in FIGS. 1–3, the body section B may be formed in a single section, or it may include a plurality of sections 10_a_, 10_b_, 10_c_ and 10_d_ which are suitably connected together, preferably by threads 10_e_ and 10_f_. The body section 10_d_ may be integral with the body section 10_a_, but if the detectors D–1 through D–16 are in contact with each other as indicated in FIG. 2 of the drawings, the body section 10_d_ is separate from the body section 10_a_ and is held in place by means of screws 11 extending from a cover plate 12 on the top of the body B.

The body B is formed with an annular slot 10_g_ which is formed at an angle extending upwardly and inwardly and is in alignment with an upper slot 10_h_ which is also in the body B. The radioactive material R which is the source of radiation transmits rays through the slot 10_g_ and the bore 10_m_ of the body B to the slot 10_h_ which is intercepted by the various detectors D–1 through D–16.

In the usual case, the body B is formed of tungsten or other similar material which is a non-conductive or barrier material insofar as radioactive rays are concerned. For that reason, the rays from the source R will pass in the direction of the arrows indicated in FIG. 1 and as directed by the angle or inclination of the slot 10_g_. Preferably, the radiation source R is formed in a complete circle or circumferential area, although the source R may be divided into smaller segments at desired intervals if a less thorough inspection of the pipe P or other object is desired. The width or size of the slot 10_g_ determines the sensitivity of the device, and if desired, the sensitivity of the device may be increased by decreasing the width of the slot 10_g_. In some cases it may be desirable to use vertically extending fins 10_r_ in the channels or grooves 10_g_ and 10_h_ for further collimation of the radiation rays reaching the detectors D–1 through D–16. Although the source R of the radiation may vary, it is preferred to use a radioactive material such as cobalt 60.

In order to prevent the radiographic rays from the source R from passing into the bore 10_m_ when the apparatus A is not in use, a tubular shield 14 which is of a material that will not allow the passage of the radiographic rays such as tungsten, is positioned within such bore 10_m_ and is adapted to slide therein so as to close the slots 10_g_ and 10_h_. The sleeve 14 is preferably formed integrally with, or is otherwise connected to, a laterally extending flange 14_a_ which is adapted to be retracted into an annular recess 10_p_ of the body B when the sleeve 14 is in the closing position.

The flange 14_b_ is welded or otherwise secured to three pairs of carriage brackets 15 which are equally spaced for supporting three equally spaced carriage wheels 16. The wheels 16 are supported on suitable axles 15_a_ carried by the carriage plates 15. The number of wheels 16 may vary so long as they permit a lateral shifting of the apparatus A with respect to the pipe P.

A conventional hydraulic cylinder 17 is attached to the body B with any suitable bracket 17_a_. A piston rod 17_b_ connected to a piston extends from the cylinder 17 and is operated by hydraulic fluid which is introduced and discharged through suitable control lines 17_c_ in the known manner. The lower end of the piston rod 17_b_ is secured by any suitable pivot pin or connecting device 17_d_ to the carriage plates 15 therebelow. Preferably, a hydraulic cylinder 17 is provided for each of the wheels 16. In use, the introduction of hydraulic pressure into the cylinder 17 causes the cylinder to rise with respect to the piston therein so as to raise the body B with respect to the wheels 16 and the sleeve 14. Thus, the body B rises so as to expose the annular slots or grooves 10_g_ and 10_h_ as they move above the upper end of the sleeve 14 to the position shown in FIG. 1.

When the pipe P or other object to be inspected is extending substantially vertically, as from a well or casing W, the wheels 16 are normally positioned at the ground level G below the usual drilling platform (not shown). If the pipe P or other object is horizontal, the wheels 16 may be omitted and instead rollers such as rollers 20 are substituted and are therefore provided at both ends of the body B. For normal inspection, with the pipe P substantially vertical, the body B is maintained in a centered position with respect to the pipe P even though the pipe P shifts laterally by a plurality of guide rollers 20 which are mounted at the upper end of the body B with resilient spring support arms 20_a_ and roller support brackets 20_b_. Preferably, the rollers 20 are spaced an equal distance from each other and they are releasably anchored to the body B with suitable screws 20_c_. In the usual case, there are three of such upper guide rollers 20 and they engage the external surface of the pipe P at its upper end, but due to the flexible spring supports 20_a_, the rollers 20 are adapted to flex laterally to compensate for increased diameter portions on the pipe P such as occur at the tool joints or upset pipe portions. If the pipe P shifts laterally, since the rollers 20 are in contact with such pipe P, the entire body B shifts causing the rollers 16 to move on the ground G so as to maintain the pipe P in the center of the bore 10_m_ and the center of the sleeve 14.

It is to be noted that the groove 10_g_ is in the shape of a frustum of a cone which is at the same angle as, and in alignment with, the slot 10_h_ which also is in the shape of a cone frustum. The detectors D–1 through D–16 extend into the body B so that they intercept the slot 10_h_ and thereby intercept the radiographic rays from the source R. It should further be noted that the cobalt 60 or other radioactive material used as the source R may be maintained in position in the slot 10_g_ by means of aluminum foil or material interposed in the slot 10_g_, so long as such material is capable of passing the radioactive rays through the bore 10_m_ and to the detectors D–1 through D–16.

The detectors D–1 through D–16 are connected in an electrical circuit, one form of which is illustrated in FIG. 3, for indicating the amount of radiation detected by each of the detectors.

Figure 4:
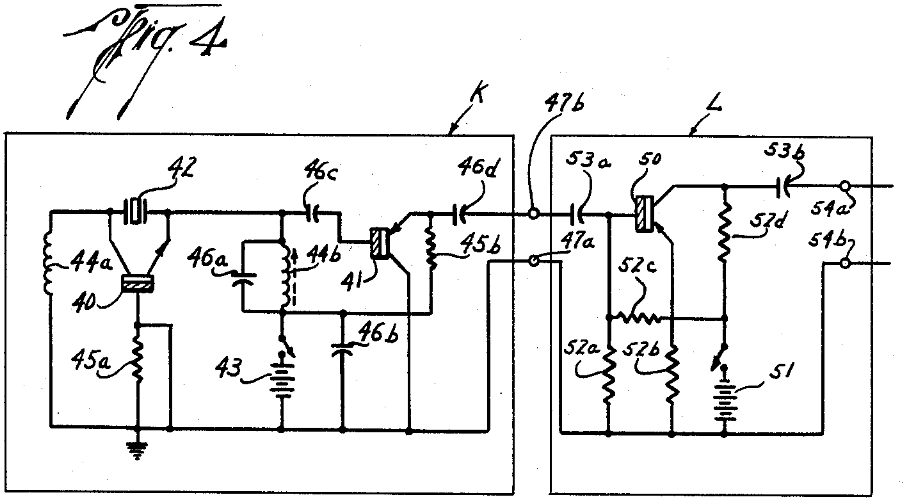
FIG. 4 is a schematic electrical circuit illustrating in detail one type of oscillator circuit which may be used in the circuit of FIG. 3.
Figure 5:
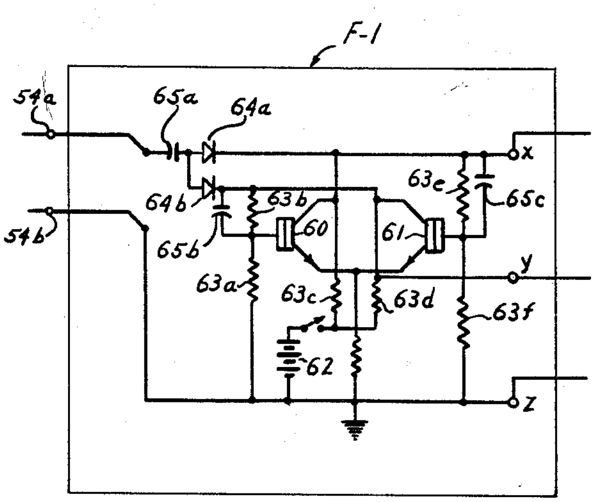
FIG. 5 is a schematic electrical circuit illustrating one type of switching means which may be used in the electrical circuit shown in FIG. 3.

Referring now to FIG. 3 in particular, the electrical circuit includes an oscillator K, one type of which is illustrated in detail in FIG. 4 of the drawings and which will be described in detail hereinafter. Such oscillator K provides the scanning or switching frequency necessary for the switching of the Geiger tubes or detectors D–1 through D–16. As will be explained, the particular oscillator K illustrated in FIG. 4 is constructed for one-hundred kilocycle oscillation, but any suitable frequency can be used. The oscillator K is connected with a pulse inverter L of any standard construction for converting the negative pulses from the oscillator K to positive pulses so that only positive pulses are transmitted to the first flip-flop circuit F–1. The details of the flip-flop circuit F–1 are shown in FIG. 5 and will be described more in detail hereinafter. Such circuit F–1 includes output terminals X, Y and Z. The flip-flop circuit F–1 is connected as illustrated in FIG. 3 to a plurality of flip-flop circuits F–2 through F–15. Each of such flip-flop circuits F–1 through F–15 has output terminals X, Y and Z which are interconnected as illustrated in FIG. 3. Each of the flip-flop circuits is so constructed that it alternately delivers one output pulse each time that an input pulse is received by the circuit, but such output pulse is alternated automatically by the circuit. Thus, when the flip-flop circuit F–1 receives a positive pulse from the oscillator K through the inverter L, it initially transmits an output pulse through the terminals Y and Z. When the flip-flop circuit F–1 receives the next positive pulse from the oscillator K through the inverter L, the output pulse is transmitted through the terminals X and Z. Such alternate output pulses continue automatically, as will be explained more in detail in connection with FIG. 5 which shows one of the flip-flop circuits F–1.

A plurality of one-shot multivibrator circuits V–1 through V–16 are positioned in the circuit of FIG. 3 between the flip-flop circuits and the Geiger counters or detectors D–1 through D–16. Thus, there is a one-shot multivibrator or univibrator with each of the detectors, one of which is illustrated in detail in FIG. 6 and will be explained hereinafter. Each of the one-shot multivibrators V–1 through V–16 delivers an output signal pulse each time it is triggered into operation by an input signal pulse from one of the flip-flop circuits. As will be understood by those skilled in the art, and as will be more evident from the detailed description of the univibrator of FIG. 6, the duration or width of the outpulse from the one-shot multivibrator is governed by the resistance and capacitance values in the circuit.

The electrical circuit of FIG. 3 includes a high voltage circuit and amplifier circuit H which is connected as shown in FIG. 3 to the detectors and the one-shot multivibrators. Such high voltage supply and amplifier H is shown in detail in FIG. 7 and is described hereinafter. The amplifier of the high voltage amplifier circuit H is connected to a conventional monitoring circuit M, one form of which is illustrated in FIG. 8 in detail. Such monitoring circuit M receives a signal from the amplifier of the circuit H. The monitoring circuit M is also connected to individual neon indicator lamps N–1 through N–16, one of which is provided for each of the detectors D–1 through D–16, respectively. The monitoring circuit M has its sensitivity set so that it will complete the circuit to the respective neon lamp when a defect is detected by one of the detectors. The neon lamps are preferably located in the same circumferential position with respect to the oscilloscope S as the detectors are with respect to the pipe P (FIG. 1 and FIG. 2) so that the circumferential location of the defect is thereby indicated by the particular neon lamp which is energized at a particular time. Such monitoring circuit M may also be used to actuate other indicator means besides the neon lamps, such as a spray paint gun which actually marks the defective area of the pipe automatically when such defect is detected with the particular detector.

In addition to the neon lamps N–1 through N–16, a visual indication of the extent of the defect may be obtained by the oscilloscope S which is connected to the high voltage amplifier circuit H. The oscilloscope S is also connected to the oscillator K to synchronize the scanning rate of the Geiger counters or detectors with the scanning rate of the oscilloscope S. A typical pattern showing defects **30*a*, 30*b* and 30*c* is shown on the oscilloscope in FIG. 3. The amount of departure from the base line 30*d*** indicates the extent of the defect or change in the wall thickness of the particular point on the pipe or other object.

In some instances, it may be desirable to have the strip recorder means T either in addition to, or as a substitute for, the oscilloscope S. Such recorder system T is schematically illustrated in FIG. 3 and includes the strip chart 31 which is mounted on a supply reel **31*a* and a windup or take-up reel 31*b*. The windup reel 31*b* is driven by a shaft 32 connected through a magnetic clutch 33 to a servomotor 34 which is a slave-servo for the servotransmitter 35 which is electrically connected thereto by suitable wires 35*a* in the known manner. The servotransmitter 35 is driven by one of the rollers 20 (FIG. 1) which engages the pipe P so that as the pipe P is moved in one direction in contact with one of such rollers 20, the transmitter 35 electrically drives the slave-servo 34. The magnetic clutch 33 includes a solenoid 33*a* which serves to disengage the magnetic clutch 33 if the direction of the pipe P is reversed from its intended direction for recording. In other words, normally, the pipe P is inspected as it is pulled or withdrawn from the well W. Therefore, the magnetic clutch 33** is released if the pipe P is being lowered into the well W.

The chart 31 has a stylus 36 of any conventional construction for marking the strip chart 31 in contact therewith. Such stylus 36 is operated by a solenoid coil 37 schematically shown in FIG. 3 which is connected into the electrical lines leading from the high voltage amplifier circuit H, whereby as each detector D–1 through D–16 is separately energized, the stylus 36 is moved in response to the amount of radiation detected by each individual detector. The chart 31 actually records the maximum radiation reading at a particular elevation in the pipe since the tape 31 is moving at the same rate as the pipe P. Thus, if a crack is present in the pipe P, the length of the crack is indicated as at **31*c* on the record 31**.

Referring now to FIG. 4, wherein one type of the oscillator K is illustrated, such oscillator includes a transistor 40 which is of the n-p-n type and serves as a common base oscillator. A transistor designated type "2N94" is preferably used for transistor 40. A second transistor 41 of the p-n-p type is used in the circuit of the oscillator K as the common-collector output amplifier. A type "2N34" transistor is normally employed for the transistor 41 of the circuit K.

The circuit K is a crystal controlled oscillator and includes a crystal 42 and a battery 43 preferably of three volts. The circuit includes inductors **44*a* and 44*b*, resistances 45*a* and 45*b*, as well as capacitors 46*a*, 46*b*, 46*c* and 46*d*. The oscillator is tuned to the crystal frequnecy by adjusting the slug in the inductor 44*b* for peak deflection on a radio frequency vacuum tube voltmeter connected to the radio frequency output terminals 47*a* and 47*b*. For maximum stability of the oscillator K, the capacitors 46*a* and 46*c*** must be of the silvered mica type.

FIG. 4 also includes one type of simple pulse inverter L which is preferably used in the electrical circuit of FIG. 3. Such inverter L includes a transistor 50 of the p-n-p type which is commercially designated "2N114." A battery 51 is connected in the circuit together with resistors **52*a*, 52*b*, 52*c* and 52*d*. Also, capacitors 53*a* and 53*b* are in the circuit as illustrated. Such inverter L receives the pulses from the oscillator K and converts the negative pulses into positive pulses at the output lines 54*a* and 54*b***.

The output lines **54*a* and 54*b*** are connected to the first flip-flop circuit F–1, one form of which is illustrated in FIG. 5. Each of the flip-flop circuits F–1 through F–15 is preferably identical and therefore only the circuit F–1 is illustrated in detail in FIG. 5.

Such flip-flop circuit shown in FIG. 5 is comparable to the Eccles-Jordan vacuum tube circuit in that both are bistable on-off circuits delivering one output pulse alternately at each output terminal X and Y for each input pulse. In other words, each time the circuit F–1 receives a positive pulse from the input terminals **54*a* and 54*b***, an output pulse is delivered from the circuit F–1, but such output pulses alternately are delivered between the output terminals X and Z and between the outlet terminals Y and Z. The alternating output pulses are produced indefinitely until the unit is denergized.

Thus, the flip-flop circuits are basic switching circuits switching the terminal X on and the terminal Y off and then switching the terminal X off and the terminal Y on, and repeating such alternation in accordance with the frequency of the oscillator K.

For fast rise and fall times in the output pulses, radio frequency transistors 60 and 61, commercially identified as type "2N94A" and having a six megacycle cut-off are employed in the flip-flop circuit of FIG. 5. When the circuit of FIG. 5 is operating, either the transistor 60 or the transistor 61 is conducting collector current while the other transistor is cut off. Thus, a pulse is delivered to the output terminals Y and Z only when the transistor 61 conducts. Similarly, a pulse is delivered to the output terminals X and Z only when the transistor 60 conducts. The conduction is switched from the transistor 60 to the transistor 61, and vice versa, by means of the positive trigger pulse applied to the trigger input terminals **54*a*, and 54*b*** from the oscillator K and the pulse inverter L.

The flip-flop circuit F–1 includes a battery or voltage source 62 preferably of twelve volts which has a switch therewith to be closed selectively. Also, resistances **63*a*, 63*b*, 63*c*, 63*d*, 63*e*, and 63*f* are included in the circuit and are connected as illustrated in FIG. 5. Diodes 64***a* and 64*b* are included in the circuit along with capacitors 65*a*, 65*b*, and 65*c*.

When the switch to the battery 62 is closed, both of the transistors 60 and 61 will start to draw collector current through the collector load resistors 63*c* and 63*d*, respectively. However, because of random transients (perhaps due to noise components in currents), the collector current of one of the transistors 60, 61 will increase, although this action may be only momentary. If the increase occurs in the transistor 60, for example, the increased collector current will produce a rise in the voltage drop across the resistor 63*c* and this will lower the collector voltage on the transistor 60. This voltage change is coupled across to the base of the transistor 61 through the voltage divider 63*e*, 63*f*, which action lowers the base voltage of the transistor 61. As a result, the collector current of the transistor 61 decreases and this causes the collector voltage of the transistor 61 to increase. Such increase in the voltage of the transistor 61 is coupled through voltage divider 63*a* and 63*b* to the base of the transistor 60 and acts to increase the collector current at the transistor 60 still more. Such action continues rapidly in the same direction until the transistor 60 is conducting heavily (low collector voltage). The action is completed in a rapid flip. This is one of the stable states of the circuit and is preserved until the following pulse from the oscillator K and the inverter L is received. The positive pulse which is applied through the capacitor 65*a* and the two steering diodes 64*a* and 64*b* reaches the transistors 60 and 61 since the diodes 64*a* and 64*b* are so poled that they allow easy passage of the positive trigger pulses while preventing a short circuit of such transistors 60 and 61. The positive trigger voltage has little or no effect on the transistor 60 because the collector current of this transistor already is high and will undergo only a negligible change in response to a collector voltage shift. However, the trigger pulse will lower the collector voltage of the transistor 61 momentarily. Such voltage change in the transistor 61 is coupled through the voltage divider 63*a*, 63*b* to the base of the transistor 60. The effect of such action is to lower the collector current on the transistor 60. Once such lowering action is initiated, it becomes cumulative, continuing rapidly until the transistor 60 is cut off and the transistor 61 is conducting. This is the other stable state of the circuit F–1. This circuit derives its name from the fact that its conducting and non-conducting states are attained in rapid flips from conduction to cutoff, not by a smooth variation between zero and maximum current flow. This on-off action is, of course, true switching. The function of the commutating, or speedup capacitors 65*b* and 65*c* is to transmit high frequency trigger pulses directly from one transistor to the opposite base to accelerate the initiation of switching at repetition rates up to two-hundred kilocycles. The output pulse wave form essentially is rectangular with a peak-to-peak amplitude of approximately ten volts. The rise time is approximately one microsecond and the fall time is approximately one-half of a microsecond, with a pulse width of approximately two and one-half microseconds. The trigger pulses must be positive-going with a peak amplitude of ten volts maximum and rapid rise and fall times.

Figure 6:
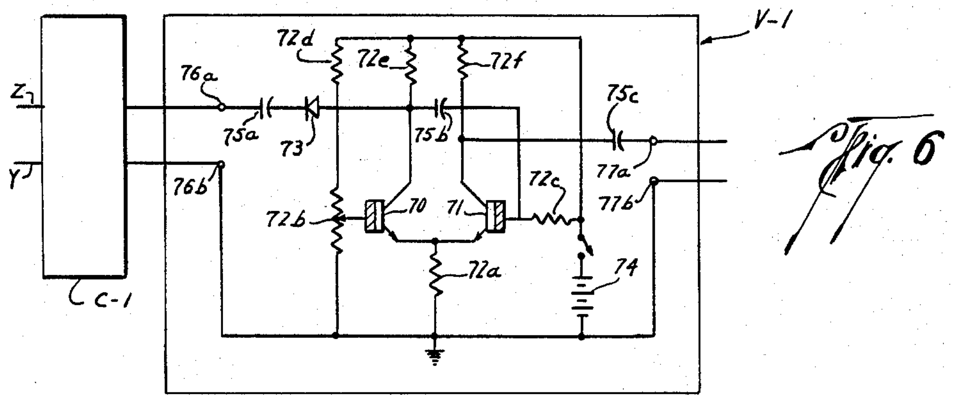
FIG. 6 is a schematic electrical circuit illustrating a one-shot multivibrator or univibrator which is preferably used in conjunction with each of the detector tubes of the electrical circuit of FIG. 3.

In FIG. 6, a detailed circuit diagram of one of the one-shot multivibrators V–1 is illustrated. It will be understood that all of the other one-shot multivibrators or univibrators V–1 through V–16 may be identical with that shown in FIG. 6. The univibrator V–1 is shown as connected with the terminals or lines Y and Z in the same manner as illustrated in FIG. 3, but it will be understood that the other univibrators are connected as shown in FIG. 3, some of which are connected with terminals X and Z rather than the terminals Y and Z of their respective flip-flop circuits.

The univibrator circuit V–1 includes transistors 70 and 71 which are radio frequency transistors commercially identified as "2N94A." Such circuit V–1 employs emitter feedback which is obtained through the use of a common emitter resistor 72*a*. Resistors 72*b*, 72*c*, 72*d*, 72*e*, and 72*f* are also included in the circuit V–1. An isolating diode 73 designated commercially as "1N38A" is provided in the circuit V–1 for the input trigger pulses. A voltage source 74 with the switch therewith which is adapted to be closed as desired is provided, such voltage being preferably one and one-half volts. Also, capacitors 75*a*, 75*b* and 75*c* are provided in the circuit V–1.

When the circuit V–1 is in its quiescent state, the transistor 71 conducts comparatively heavy collector current because of the connection of its base to the positive terminal of the voltage source 74 through the resistor 72*f*. Such current flows through the common emitter resistor 72*a* and the resulting voltage drop developed across the resistor 72*a* biases transistor 70 to cut off. Transistor 70 therefore is off while the transistor 71 is on. The capacitor 75*b* is then in a charged state. Each of the univibrators V–1 through V–16 has a pulse inverter C–1 through C–16 (FIG. 3), respectively, connected electrically therewith for inverting positive input pulses from the terminals X and Z or Y and Z into negative input pulses. The pulse inverters C–1 through C–16 are conventional in construction and correspond with the inverter L of FIG. 4, except that they perform the opposite function, namely the conversion of the positive pulses to the negative pulses rather than vice versa as is the case with the inverter L. The negative pulse input which is applied to the trigger input terminals 76*a* and 76*b* from the inverter C–1 reduces the positive potential on the base of the transistor 71 and discharges the capacitor 75*b*. Such action reduces the collector current on the transistor 71 and lowers the voltage drop across the resistor 72*a*. Since the emitter bias of the transistor 70 accordingly is lowered, the transistor 70 begins to pass collector current. The transistion is rapid, the transistor 70 switching on and the transistor 71 switching off and the circuit delivering an output pulse at the output terminals 77*a* and 77*b*.

Immediately after the switching takes place within the circuit V–1, the capacitor 75*b* begins to discharge and as it does so, the positive voltage on the base of the transistor 71 begins to rise once more towards the potential of the supply voltage 74. At the end of this discharge interval, the transistor 71 again is conducting and is therefore on while the transistor 70 is non-conducting and is therefore off, the quiescent condition of the circuit. The limiting factor which sets the length of the discharge time of the capacitor 75*b* and therefore the duration of the output pulse from the terminal 77*a* and the terminal 77*b* is the voltage dropped across the resistor 72*a*. Full conduction is not restored to the transistor 71 until the base voltage of this transistor equals the emitter voltage; that is, the voltage drop across the resistor 72*a*. When the transistor 70 is conducting and the transistor 71 is cut off, the voltage drop across the resistor 72*a* is governed by the setting of the potentiometer 72*b*, which determines the direct current base bias of the transistor 70. Such variable resistor 72*b* thus affords a means for setting the duration or width of the output pulse from the circuit V–1.

Figure 9:
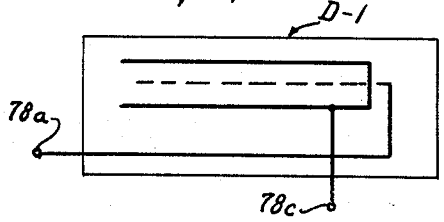
FIG. 9 is a view illustrating the electrical arrangement of the typical Geiger counter or radiation detector used in the apapratus of FIG. 1 and in the electrical circuit of FIG. 3.

One of the output terminals 77*a* of each of the univibrators shown in FIG. 6 is connected with a terminal 78*a* of one of the detectors D–1 through D–16. The other output terminal 77*b* is connected with an input terminal 78*b* (FIG. 7) of the high voltage amplifier circuit H. The detector D–1 of FIG. 9 is a standard Geiger counter or it may be any other type of scintillator tube or photo multiplier tube capable of detecting radiation from a source of radiographic rays such as cobalt 60. One of the terminals 78*c* (FIG. 9) of each of the detectors is connected to a common connecting line 79 which connects with a terminal 79*a* (FIGS. 3 and 7) of the circuit H.

Figure 7:
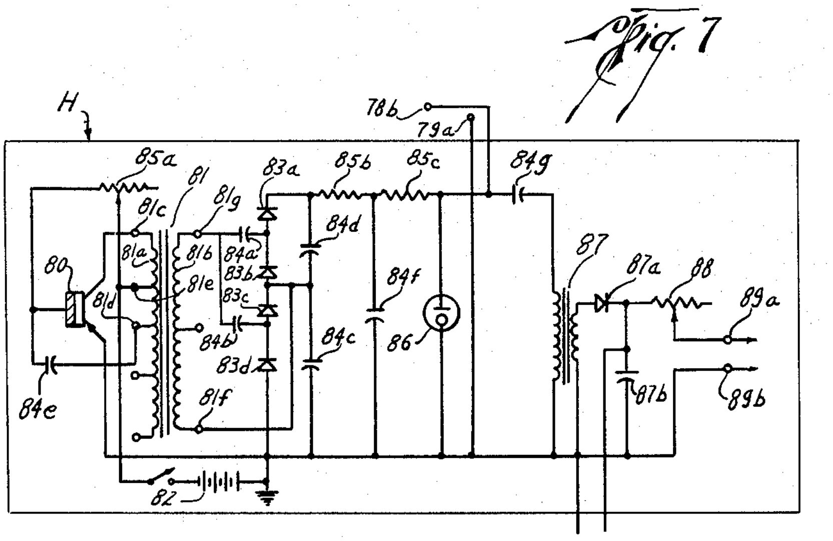
FIG. 7 is a schematic electrical circuit showing one type of high voltage supply and amplifier circuit which may be used in the electrical circuit of FIG. 3.
Figure 8:
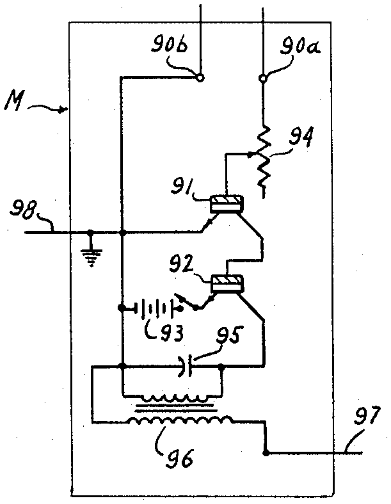
FIG. 8 is a schematic electrical circuit of the monitoring circuit illustrated in the circuit of FIG. 3.

The circuit H of FIG. 7 basically includes a Hartley type oscillator employing a high-alpha p-n-p transistor 80 which is commercially identified as "CK721." A transformer 81 having a primary winding 81A and a secondary winding **81*b* is connected to the transistor 80. A portion of the primary transformer winding 81*a* across the taps 81*c* and 81*d* forms the split tank coil of this oscillator. A suitable battery 82 of six volts is connected with a suitable switch to the transformer 81 through the tap 81*e* so that the A.C. voltage developed across the primary winding 81*a* between the taps 81*c* and 81*d* by the oscillator action is stepped up by the transformer 81 and a high voltage, somewhat higher than three-hundred volts open-circuit, is consequently available across the entire second winding 81*b* between the taps 81*f* and 81*g*. The high A.C. voltage is rectified and multiplied by a voltage-quadrupler circuit consisting of four high voltage selenium cartridges 83*a*, 83*b*, 83*c* and 83*d*, and also four capacitors 84*a*, 84*b*, 84*c* and 84*d*. It is also to be noted that a capacitor 84*e* is in the circuit with the transistor 80 and a variable resistance 85*a* is also connected therewith. Resistances 85*b* and 85*c* are likewise in the circuit H. Filtering is provided by the resistors 85*b* and 85*c* and the capacitor 84*f*. The capacitor 84*f* must have a working voltage of sixteen hundred volts. The capacitors 84*a* through 84*d* should be of the mica type. Regulation of the D.C. output voltage is accomplished by a corona-type regulation tube 86 which is across the output terminals as illustrated in FIG. 7. Such high voltage source thus described is connected to the detector tubes D–1 through D–16**, as previously explained, and preferably such tubes are Geiger tubes of the "1B85" type or any other suitable type.

As each of the detector tubes D–1 through D–16 is energized, as previously explained, the output pulse from the energized detector is delivered to the indicator circuit by the coupling transformer 87. A rheostat 88 serves as a range control. A rectifier **87*a* is provided in the circuit and also a capacitor 87*b* is provided. The amplified signal is thus received at the output terminals 89*a* and 89*b*. Further amplification of the signal from the output terminals 89*a* and 89*b*** may be provided by other conventional amplifier equipment if desired.

The terminals **89*a* and 89*b* are connected to terminals 90*a* and 90*b* (FIGS. 3 and 8) of a monitoring circuit M, one type of which is illustrated in FIG. 8 in detail. Such monitoring circuit includes transistors 91 and 92, as well as a battery 93, a variable rheostat or resistor 94, a capacitor 95 and a transformer 96. Such electrical components are connected as shown in FIG. 8. The output side of the monitoring circuit M is connected through line 97 which is connected to a common line 97*a* (FIG. 3) surrounding the oscilloscope S and to which each of the neon tubes N–1 through N–16 is connected. It is to be noted that each of the neon tubes is connected to one of the univibrators so that the circuit is complete back to the monitoring circuit through electrical line 98**.

Considering now the operation of the apparatus of FIGS. 1–9, and particularly as shown in the overall electrical circuit of FIG. 3, the apparatus A of FIG. 1 is positioned so that the radiation rays from the cobalt 60 or other radiation source R are directed through the pipe P or other object to the detectors D–1 through D–16. Each of the detectors D–1 through D–16 is switched on for approximately one-half to one microsecond and then is switched off. Such switching on and off is done in the sequence from D–1 through D–16 and continues in repetition so long as the circuit is energized. It is to be noted that the detectors D–1 through D–16 in FIG. 3 are not arranged in their normal sequence so that the electrical circuit can be more clearly illustrated. However, the sequence of the detectors is as shown in FIG. 2 and they are separately energized or switched on in the numerical order. Such Geiger tubes or detectors D–1 through D–16 are switched on and off continuously at the rate of up to and even over two-hundred kilocycles per second. Therefore, the pipe P is in effect scanned the full three hundred sixty degrees for the detection of flaws, cracks, corrosion pits and pipe wall thickness, even including the upsets and the pipe joints and ends. Flaws or other defects which permit an increase of the radiation to reach the detector tubes will cause an amplitude increase in the signal from the detector and then to the indicating means such as the oscillograph S or the recorder means T.

In the particular circuit of FIG. 3, the oscillator K operates at its selected or specified frequency, for example at one-hundred kilocycles per second. Initially, all the flip-flop circuits F–1 through F–15 are set so as to be on across the terminals X and Z and closed across the terminals Y and Z. The first pulse from the oscillator K triggers the first flip-flop circuit F–1 causing it to flip so as to close the circuit between the terminals Y and Z and open the circuit between the terminals X and Z. Therefore the terminals Y and Z are connected on while the terminals X and Z are off from the flip-flop circuit F–1 to the flip-flop circuit F–2. When the flip-flop circuit F–2 receives the pulse it flips the terminals Y–Z on and that pulse continues onto the circuit F–4 which again flips the circuit F–4 to the terminals Y–Z to send a pulse to the flip-flop circuit F–15. The terminals Y–Z of the circuit F–15 are then turned on to trigger an impulse to the one-shot multivibrator V–1. The momentary operation of the one-shot multivibrator V–1 causes the detector D–1 to momentarily conduct and therefore detect radiation amplitude from the radiation source R.

After the detector D–1 has been energized, the oscillator K sends out another pulse which shifts the circuit F–1 to turn the terminals X–Z on so as to energize the flip-flop circuit F–3. The circuit F–3 has not previously been energized so it switches the terminals Y–Z on which sends the pulse to the circuit F–6. The terminals Y–Z of the circuit F–6 are then turned on and sends the pulse to the circuit F–11 which are connected through the terminals Y–Z to the one-shot multivibrator V–2 and the detector D–2. Thus, the second detector D–2 is momentarily energized to detect radiation. The next pulse from the oscillator K effects a change in the flip-flop circuit so as to energize the detector D–3 through the flip-flop circuit F–1, F–2, F–5 and F–13. The same sequence occurs for the other detectors D–16 as will be understood by those skilled in the art.

The sequence of the momentary turning on of each of the detector tubes D–1 through D–16 continues at a repetition rate of one-hundred kilocycles per second causing three-hundred sixty degrees scanning of the pipe wall as the pipe is moved through the body B of the apparatus A. Higher scanning rates may be obtained by increasing the oscillation rate at the oscillator K.

It will be understood that each of the detectors is connected in circuit with the high voltage amplifier circuit H and thus with the oscilloscope S so as to give a visual indication on the oscilloscope of the condition of the pipe as it is being scanned by the detectors. The recorder means T gives a permanent record, as previously explained. The neon tubes N–1 through N–16 give an immediate visual indication of defects and their location circumferentially with respect to the pipe P.

Figure 10:
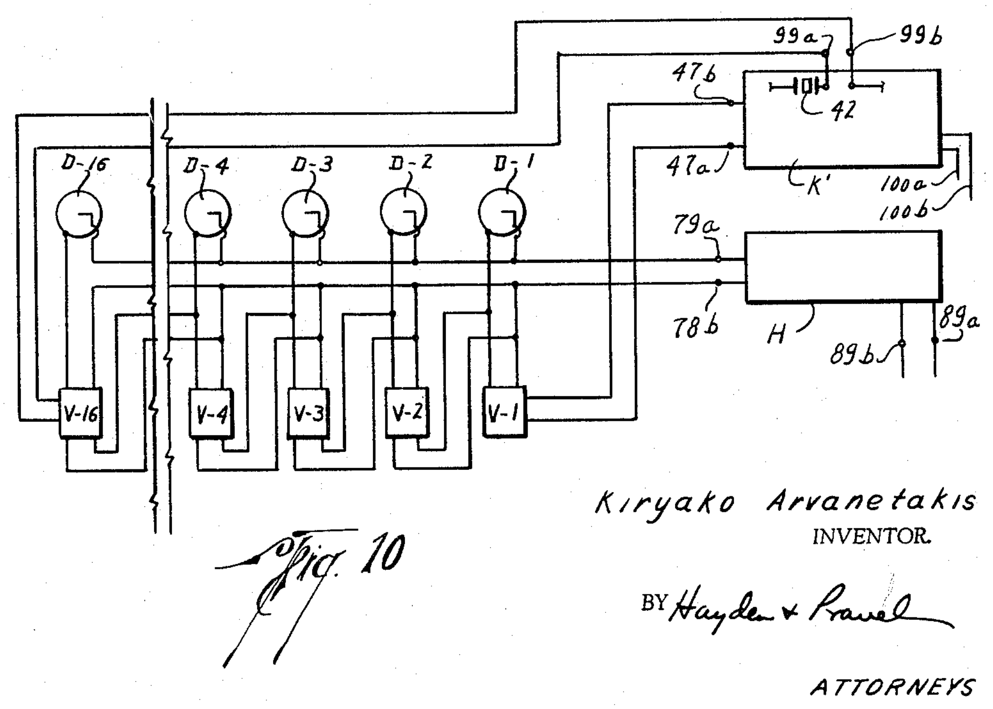
FIG. 10 is an electrical circuit illustrating a modified form of the electrical circuit of FIG. 3.

In FIG. 10, a modified form of the invention is illustrated, wherein the flip-flop circuits F–1 through F–15 of FIG. 3 are omitted and instead, a modified oscillator circuit K' is utilized and is connected in parallel with the one-shot multivibrators V–1 through V–16. It is to be noted also that in FIG. 10 the detectors D–1 through D–6 are shown in their numerical sequence as they actually are installed circumferentially in the apparatus A and as shown in FIG. 2. The detectors D–5 through D–15 have been omitted from FIG. 10 for simplification, but it will be understood that they are positioned between the detectors D–4 and D–16. Each of the detectors has a one-shot multivibrator or univibrator connected therewith as shown in FIG. 10. The first univibrator V-1 is connected to the terminals 47a and 47b of the oscillator K'. The last univibrator V-16 is connected to terminals 99a and 99b of the oscillator K'.

Th oscillator K' is identical with the oscillator K, which is illustrated in one form in FIG. 4, except that the terminals 99a and 99b are connected to the crystal 42 as illustrated in FIG. 10. The remainder of the circuit K' is identical with the circuit K of FIG. 4. The oscillator K' has lead lines 100a and 100b which lead to the oscilloscope S for synchronizing their operation as previously noted in connection with FIG. 3. The high voltage and amplifier circuit H is identical with that of FIG. 3 and the terminals 89a and 89b are connected with the oscilloscope S and the recorder means T, and may also be connected with the monitoring circuit M of FIG. 3, if desired.

The circuit of FIG. 10 operates by the oscillator K' sending out its pulses which pass through the univibrators V-1 through V-16 in sequence. Thus, when the oscillator K' sends out a pulse at the output terminals 47a and 47b, it passes first to the univibrator circuit V-1 which momentarily switches such circuit on and also thereby switches the detector D-1 on. The pulse from the multivibrator V-1 then actuates the multivibrator V-2 causing it to be switched on and the detector D-2 to be switched on momentarily. It will be understood that the detector D-1 has been switched off by the switching off of the univibrator circuit V-1 prior to the switching on of the univibrator circuit V-2. Thus, there is a continuous successive switching on of each of the univibrator circuits so that there is only one of such circuits and only one of the detector tubes on at a time. After the pulse leaves the last univibrator V-16 it is transmitted to the terminals 99a and 99b and thus is synchronized so as to discharge from the oscillator K' the next pulse to the first univibrator V-1. In that way, the oscillator K' does not send out a pulse until the last univibrator has been actuated and the pulse has returned it to the oscillator K'. In the circuit of FIG. 10, therefore, the univibrators act as the switch means and also the means for momentarily energizing each of the detectors successively.

Figure 11:
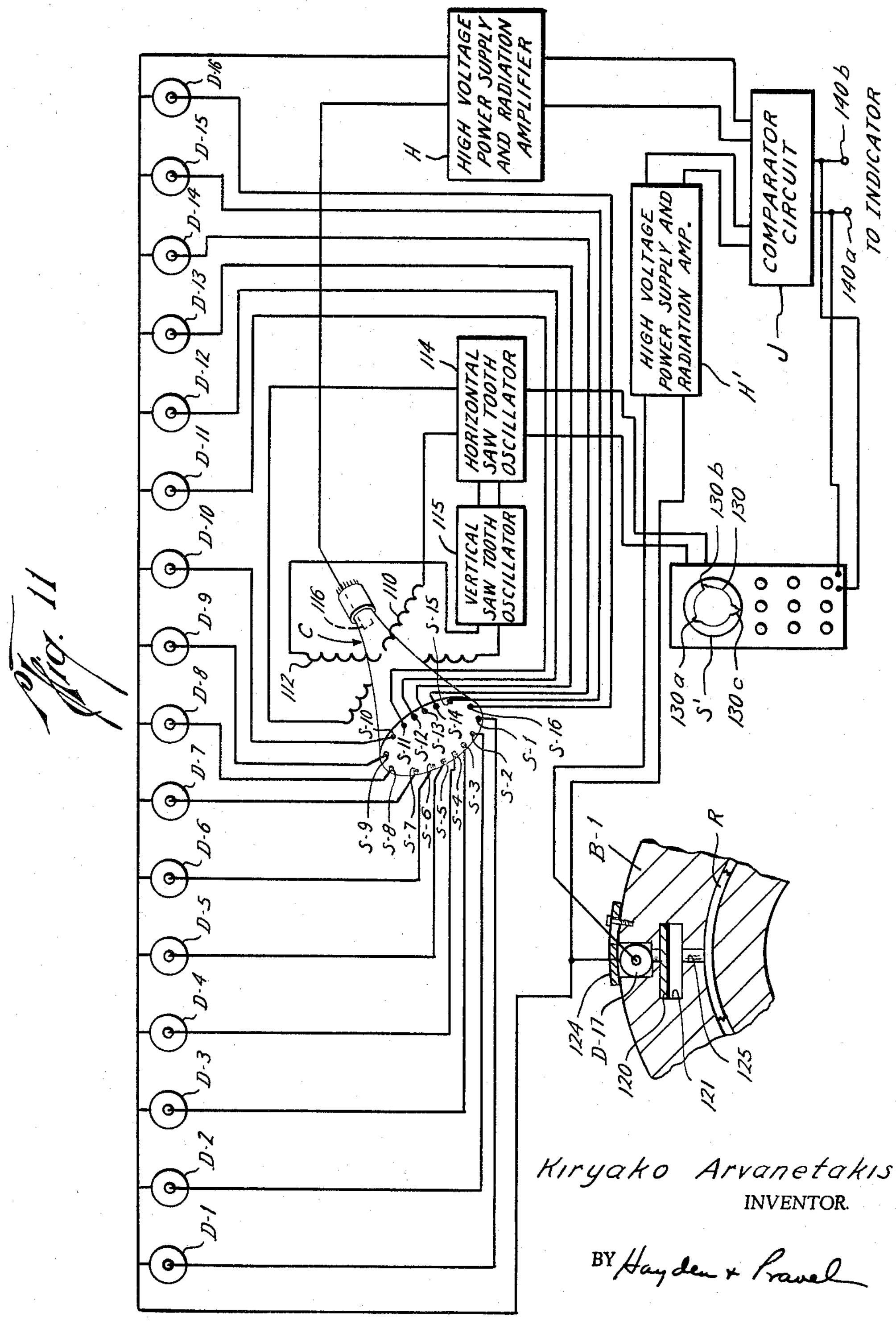
FIG. 11 is a schematic electrical circuit illustrating a modified form of the electrical circuit of FIG. 3, wherein electron tubes or diodes are employed in the circuit rather than transistors as in FIG. 3.

In FIG. 11, a modification is illustrated wherein the solid state switching of FIGS. 3-10 is replaced by electron tube switching. The detector tubes D-1 through D-16 are the same as in FIGS. 1-3 and are likewise switched on in succession as in FIG. 3. The circuit of FIG. 11 employs a cyclophone type of vacuum tube C which is of known construction and which includes a horizontal deflection coil 110 and a vertical deflection coil 112. Such deflection coils 110 and 112 are also of known construction and are controlled through a horizontal saw-tooth oscillator 114 and a vertical saw-tooth oscillator 115, respectively, in the known manner so that the electrons emitted from the emitter source 116 of the tube C are caused to travel in a circular path on the face of the tube C. A plurality of plates or terminals S-1 through S-16 are mounted on the face of the tube C and are sequentially scanned by the electronic beam as it moves in its circular path. The cyclophone tube thus acts as a high speed switch in that it turns on each of the detectors momentarily as the beam reaches each of the plates S-1 through S-16, due to the fact that the plates S-1 through S-16 are connected to the detectors D-1 through D-16, respectively, as shown in FIG. 11. Only one of such detectors is thus switched on at any particular time, as explained above in connection with FIGS. 3 and 10.

The Geiger tubes or detectors D-1 through D-16 are each connected in series with the plates S-1 through S-16 and with the common power supply and amplifier H which corresponds with the power supply and amplifier of FIGS. 3 and 7.

The signal from each of the detectors is amplified in the circuit H and is sent to a standard comparator or algebraic rectifier circuit J. The comparator circuit J is also connected with a high voltage power supply and radiation amplifier H' which is connected to a standard Geiger tube or detector D-17, so that the signal from the standard detector tube D-17 is algebraically compared in the circuit J with each of the signals from the detectors D-1 through D-16.

The standard detector tube D-17 is mounted in a modified form of the body B-1 (FIG. 13) which is adapted to receive a standard sample or section 120 from the pipe or other object being inspected with the apparatus A of this invention. Such standard sample or specimen 120 is positioned within a slot 121 in the body B-1 and is removably held in position by a sliding plate 122. The detector D-17 is held in a recess 123 by any suitable sliding plate 124 or other means so as to position the detector D-17 on the opposite side of the plate 120 from the radiation source R. A slot 125 is provided in the body B-1 from the radiation source to the standard specimen 120 and also to the detector tube D-17 so that the radiation passing through the specimen sample 120 is constantly detected by the detector D-17. The detector D-17 is in turn connected into the electrical circuit of FIG. 11 as shown therein so as to feed the standard detection amount from the detector D-17 into the comparator circuit J.

An oscilloscope S' is connected to the tube C electrically as shown in FIG. 11 and is thereby synchronized so that the sweeping or scanning in the circular three-hundred sixty degree pattern of the tube C is in unison with the scanning by the oscilloscope S', as will be well understood by those skilled in the art. The output signals from the comparator circuit are fed to the oscilloscope S' so as to cause any differences between the standard detector D-17 and each of the detectors D-1 through D-16 successively to indicate defects or changes in radiation at each of such detectors. A pattern 130 on the oscillascope S' illustrates defects 130a, 130b and 130c. It should be noted that the sample 120 is of the same material as the pipe or casing being inspected and also it is of twice the normal wall thickness of such pipe since the radiation is passing through two thicknesses to the detector tubes D-1 through D-16.

Other types of indicator means may be connected at terminals 140a and 140b of the comparator circuit if desired. For example, the recorder means T of FIG. 3 could be connected to such terminals 140a and 140b.

In FIG. 12, another type of cyclophone vacuum tube C-1 is illustrated, which is identical with that tube C shown in FIG. 11, except that deflection plates 110a and 112a are employed for the horizontal and vertical deflection controls of the electron beam rather than the deflection coils 110 and 112.

It should be noted that the comparator circuit J may be used in conjunction with the standard sample 120 and the standard detector D-17 of FIG. 11 in connection with the circuit of FIG. 3 if it is desired to get a comparison indication on the oscilloscope S with the standard sample. In such case, the comparator circuit J would be connected to the terminals 89a and 89b of the circuit H of FIG. 3 and would have the oscilloscope S', the high voltage power supply and radiation amplifier H' and the standard sample detector D-17 connected as shown in FIG. 11 therewith.

FIG. 14 illustrates the modified body B-2 which is identical with the body B of FIG. 1 except that it is made integral and the slots 10g are drilled or molded rather than being formed at the ends of the various threaded sections as in FIG. 1. The sleeve 214 of FIG. 14 is modified as compared to the sleeve 14 of FIG. 1 to provide a variable size inner bore or diameter so as to position the guide slots for the radiation rays closer to smaller diameter pipes or other objects within the bore of the apparatus A. Thus, the sleeve 214 is formed of aluminum so that rays from the radiation source R pass therethrough. An inner sleeve 215 formed of tungsten or other material through which radiation rays cannot pass is attached to the aluminum sleeve 214 with screws 216 or any other suitable attaching means. The sleeve 215 has annular slots **215*a* and 215*b* formed therein. The groove or slot 215*a* is in alignment with the groove or slot 10*g* so that the radiographic rays from the source R may pass through the slot 10*g*, the aluminum 214 and then the slot 215*a* to be directed to the pipe or other object internally of the sleeve 215. The slot 215*b* is in alignment with the slot 215*a* so that the radiographic rays therefrom pass to the slot 215*b* and then into the slot 10*h* to the detectors. The thickness of the sleeve 215 may be varied to reduce the bore thereof for smaller diameter pipe or other object being inspected so that the slots 215*a* and 215*b*** are as close as reasonably possible to the external surfaces of such pipes or other objects. A more accurate indication of the condition of the pipe is thereby obtained with the smaller sizes of pipe. In all other respects, the form of the invention shown in FIG. 14 is used in the same manner as heretofore described in connection with FIG. 1.

FIG. 15 is a further modification wherein the radiation source R′ which is again cobalt 60 or any other similar material is mounted on a solenoid stem 150 of a conventional solenoid 151 which is electrically connected with suitable wires **151*a* leading to any source of power to energize the solenoid 151 when desired. The solenoid 151 with the radiation source R′ is positioned in a recess 152** within the body B–3 of FIG. 15. The rest of the body B–3 is preferably identical with that described heretofore in connection with FIG. 1.

With the construction of FIG. 15, the sleeve 14 does not need to be retractable or movable into position in front of the slot **10*g* because the radiation source R′ is retractable from the open slot 10*g* to a point therebelow as shown in FIG. 15 so that the rays from the source R′ cannot escape. However, when it is desired to use the apparatus, the radiation source R′ may be readily raised by energizing the solenoid 151 to cause the solenoid stem 150 to rise upwardly to position the radiation source R′ in alignment with the slot 10*g* so that the source R′ then functions exactly as the radiation source R of FIG. 1. The withdrawal of the radiation source R′ to the position of FIG. 15 provides an added safety feature of this invention since it isolates the radiation material within the tungsten body and prevents any inadvertent exposure to the radioactive substance. The cover 14** likewise does the same thing even if the radiation source is fixed as illustrated in FIG. 1. Furthermore, the radiation source is protected on its external surface at all times insofar as the operators are concerned since the only radiation exposure is directed inwardly towards the pipe or other object being exposed. This of course provides maximum safety for the operators of the equipment.

Additionally, by the use of the tungsten for the body of the apparatus A, the radiation source will remain confined within the body even if the well blows out or catches fire since the tungsten can withstand temperatures of ten thousand degrees Fahrenheit and therefore would adequately protect the radiation source under any conceivable circumstance.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for radiographic inspection of pipe, rods and other objects, comprising:
(*a*) a source of radiographic rays positioned externally of the object to be inspected,
(*b*) a plurality of radiation detectors also positioned externally of said object,
(*c*) means for directing radiographic rays from said source through said object to said radiation detectors,
(*d*) indicator means for indicating the radiation detected by each of said plurality of detector means,
(*e*) switch means for successively electrically connecting said indicator means to each of said detectors for thereby indicating the condition of successive portions of said object, and
(*f*) means for imparting relative longitudinal movement between said object and said apparatus while said detectors are successively switched to thereby spirally scan the object with the radiographic rays.

2. An apparatus for radiographic inspection of pipe, rods and other objects, comprising:
(*a*) a source of radiographic rays positioned externally of the object to be inspected,
(*b*) a plurality of radiation detectors also positioned externally of said object,
(*c*) means for directing radiographic rays from said source through said object to said radiation detectors,
(*d*) means for successively switching from one of said detectors to the next for thereby radiographically scanning said object,
(*e*) means for imparting relative longitudinal movement between said object and said apparatus while said detectors are successively switched, and
(*f*) recorder means operable in response to said relative longitudinal movement for recording of defects and other conditions of the object.

3. An apparatus for radiographic inspection of pipe, rods and other objects, comprising:
(*a*) a source of radiographic rays positioned externally of the object to be inspected,
(*b*) a plurality of radiation detectors also positioned externally of said object,
(*c*) means for directing radiographic rays from said source through said object to said radiation detectors,
(*d*) indicator means for indicating the radiation detected by each of said plurality of detector means,
(*e*) switch means for successively electrically connecting said indicator means to each of said detectors for thereby indicating the condition of successive portions of said object,
(*f*) said switch means including:
  (1) a one-shot multivibrator circuit connected in series with each of said detectors and said indicator means,
  (2) a plurality of sequentially arranged flip-flop circuits connected to said one-shot multivibrator circuits, and
  (3) means for introducing positive pulses into said flip-flop circuits for causing them to successively energize each of said one-shot multivibrator circuits for successively energizing each of said detectors.

4. An apparatus for radiographic inspection of pipe, rods and other objects, comprising:
(*a*) a source of radiographic rays positioned externally of the object to be inspected,
(*b*) a plurality of radiation detectors also positioned externally of said object,
(*c*) means for directing radiographic rays from said source through said object to said radiation detectors,
(*d*) indicator means for indicating the radiation detected by each of said plurality of detector means,
(*e*) switch means for successively electrically connecting said indicator means to each of said detectors for thereby indicating the condition of successive portions of said object,
(*f*) said switch means including:
  (1) a cyclophone vacuum tube having a plate for each of said detectors, and
  (2) means electrically connecting each of said plates in series with one of the detectors and said indicator means for electrically transmitting the amount of radiation detected by each detector to said indicator means.

References Cited by the Examiner

UNITED STATES PATENTS

| | | | |
|---|---|---|---|
| 2,508,772 | 5/50 | Pontecorvo | 250—83.6 |
| 2,885,557 | 5/59 | Kizaur | 250—106 |
| 2,900,513 | 8/59 | Duffy | 250—209 |
| 2,922,884 | 1/60 | Fearnside | 250—83.4 |
| 2,965,758 | 12/60 | Malick | 250—83.4 |
| 3,066,254 | 11/62 | Price | 250—83.4 |

FOREIGN PATENTS

| | | |
|---|---|---|
| 847,129 | 9/60 | Great Britain. |

RALPH G. NILSON, *Primary Examiner.*